US009625644B2

United States Patent
Shin et al.

(10) Patent No.: US 9,625,644 B2
(45) Date of Patent: Apr. 18, 2017

(54) BACKLIGHT ASSEMBLY AND DISPLAY DEVICE HAVING THE SAME

(71) Applicant: Samsung Display Co., LTD., Yongin-si, Gyeonggi-Do (KR)

(72) Inventors: Jin-Soo Shin, Hwaseong-si (KR); Young-Jae Lee, Yongin-si (KR); Jeoung-Gwen Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/980,776

(22) Filed: Dec. 28, 2015

(65) Prior Publication Data
US 2016/0131829 A1 May 12, 2016

Related U.S. Application Data

(60) Continuation of application No. 14/449,303, filed on Aug. 1, 2014, now Pat. No. 9,244,216, and a division (Continued)

(30) Foreign Application Priority Data

Aug. 6, 2004 (KR) .................. 10-2004-0062141

(51) Int. Cl.
*F21V 7/04* (2006.01)
*F21V 8/00* (2006.01)
(52) U.S. Cl.
CPC .......... *G02B 6/0088* (2013.01); *G02B 6/009* (2013.01)

(58) Field of Classification Search
CPC ............... G02B 6/0086; G02B 6/0095; G02F 2001/133314; G02F 2001/133322;
(Continued)

(56) References Cited

U.S. PATENT DOCUMENTS 5,966,191 A * 10/1999 Lee .................. G02F 1/133308
349/58
6,545,428 B2    4/2003  Davenport et al.
(Continued)

FOREIGN PATENT DOCUMENTS

JP          06186432 A      7/1994
JP          11133393 A      5/1999
(Continued)

*Primary Examiner* — William Carter
(74) *Attorney, Agent, or Firm* — Cantor Colburn LLP

(57) ABSTRACT

A backlight assembly includes a light guide plate (LGP) having a stepped portion formed at a corner of the LGP, an optical sheet disposed over the LGP and a receiving container receiving the LGP and the optical sheet. The receiving container includes a bottom plate, first through fourth sidewalls and a first LGP fixing portion. The second sidewall is adjacent to the first sidewall. The third sidewall faces the first sidewall. The fourth sidewall faces the second sidewall. The first through fourth sidewalls are extended upwardly from edge portions of the bottom plate. The first LGP fixing portion is formed at the first sidewall such that the LGP fixing portion corresponds to the stepped portion of the LGP. Therefore, a display device is easily assembled. Furthermore, a defilement that may occur during an assembling process may be reduced to enhance productivity.

18 Claims, 9 Drawing Sheets

Related U.S. Application Data of application No. 13/847,588, filed on Mar. 20, 2013, now Pat. No. 8,827,534, and a continuation of application No. 11/185,511, filed on Jul. 20, 2005, now Pat. No. 8,414,176.

(58) Field of Classification Search
CPC ........... G02F 2201/46; G02F 1/133608; F21V 15/01; F21V 21/00; F21V 23/009
USPC .......................................... 362/628, 632–634
See application file for complete search history.

(56) References Cited

U.S. PATENT DOCUMENTS

| | | |
|---|---|---|
| 6,595,651 B2 | 7/2003 | Jeong et al. |
| 6,667,780 B2 | 12/2003 | Cho |
| 6,950,154 B2 | 9/2005 | Lee |
| 2001/0003471 A1 | 6/2001 | Lee et al. |
| 2001/0050731 A1* | 12/2001 | An ..................... G02B 6/0088 349/58 |
| 2002/0060758 A1* | 5/2002 | Jeong ................... G02B 6/0068 362/628 |
| 2003/0179580 A1 | 9/2003 | Ito et al. |
| 2004/0160549 A1 | 8/2004 | Park |
| 2005/0195621 A1 | 9/2005 | Chang et al. |

FOREIGN PATENT DOCUMENTS

| | | |
|---|---|---|
| JP | 2002042535 A | 2/2002 |
| KR | 1020030020184 A | 3/2003 |
| KR | 1020030076315 A | 9/2003 |
| KR | 1020030091570 A | 12/2003 |
| TW | 512249 | 12/2002 |
| TW | 525791 U | 3/2003 |
| TW | 200307155 | 12/2003 |

* cited by examiner

BACKLIGHT ASSEMBLY AND DISPLAY DEVICE HAVING THE SAME

CROSS REFERENCE TO RELATED APPLICATIONS

This application is a continuation of U.S. patent application Ser. No. 14/449,303, filed on Aug. 1, 2014, which is a divisional of U.S. patent application Ser. No. 13/847,588, filed on Mar. 20, 2013, which is a continuation of U.S. patent application Ser. No. 11/185,511, filed on Jul. 20, 2005, which claims priority to Korean Patent Application No. 2004-62141, filed on Aug. 6, 2004 and all the benefits accruing therefrom under 35 U.S.C. §119, and the contents of which in its entirety are herein incorporated by reference.

BACKGROUND OF THE INVENTION

1. Field of the Invention

The present invention relates to a backlight assembly and a display device having the backlight assembly. More particularly, the present invention relates to an easily assembled backlight assembly, and a display device having the backlight assembly.

2. Description of the Related Art

A backlight assembly generates light for displaying images. The backlight assembly is used for a liquid crystal display device that displays images by using liquid crystal.

A conventional backlight assembly includes a lamp assembly that generates light, a light guide plate that adjusts a path of the light, a light-reflecting plate disposed under the light guide plate to reflect light escaping the light guide plate, and optical sheets that enhance optical properties of the light generated from the lamp assembly. Additionally, the conventional backlight assembly includes a bottom chassis, a receiving container and a panel-guiding member. The bottom chassis and the receiving container receive the lamp assembly, the light guide plate, the light-reflecting plate and the optical sheets. The bottom chassis can be made of metal and the receiving container can be made of, for example, plastic. The panel-guiding member prevents a display panel from drifting from the receiving container.

SUMMARY OF THE INVENTION

The present invention provides an easily assembled backlight assembly.

The present invention also provides a display device having the above-mentioned backlight assembly.

In exemplary embodiments of a backlight assembly, the backlight assembly includes a light guide plate, an optical sheet and a receiving container. The light guide plate has a stepped portion formed at a corner of the light guide plate. The optical sheet is disposed over the light guide plate. The receiving container receives the light guide plate and the optical sheet. The receiving container includes a bottom plate, a first sidewall, a second sidewall, a third sidewall, a fourth sidewall and a first light guide plate fixing portion. The second sidewall is adjacent to the first sidewall. The third sidewall faces the first sidewall. The fourth sidewall faces the second sidewall. The first through fourth sidewalls are extended upwardly from edge portions of the bottom plate. The first light guide plate fixing portion is formed at the first sidewall such that the first light guide plate fixing portion corresponds to the stepped portion of the light guide plate.

In exemplary embodiments of a display device, the display device includes a backlight assembly, a panel-guiding member and a display panel. The backlight assembly includes a light guide plate, an optical sheet and a receiving container. The light guide plate has a stepped portion formed at a corner of the light guide plate. The optical sheet is disposed over the light guide plate. The receiving container receives the light guide plate and the optical sheet. The receiving container includes a bottom plate, a first sidewall, a second sidewall, a third sidewall, a fourth sidewall and a first light guide plate fixing portion. The second sidewall is adjacent to the first sidewall. The third sidewall faces the first sidewall. The fourth sidewall faces the second sidewall. The first through fourth sidewalls are extended upwardly from edge portions of the bottom plate. The first light guide plate fixing portion is formed at the first sidewall such that the first light guide plate fixing portion corresponds to the stepped portion of the light guide plate. The panel-guiding member is combined with the receiving container. The display panel is disposed on the panel-guiding member. The display panel converts light generated from the backlight assembly into an image.

In exemplary embodiments of a method for assembling a display device in a top down assembling process, the method includes providing a receiving container with a light guide plate fixing portion, providing a light guide plate with a stepped portion at a corner of the light guide plate, placing the light guide plate into the receiving container, and aligning the light guide plate fixing portion with the stepped portion.

The light-reflecting plate, the light guide plate, the lamp assembly, the panel-guiding member and the display panel are assembled in sequence through a top-down assembling method. Therefore, a display device is easily assembled. Furthermore, a defilement that may happen during an assembling process may be reduced to enhance productivity.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
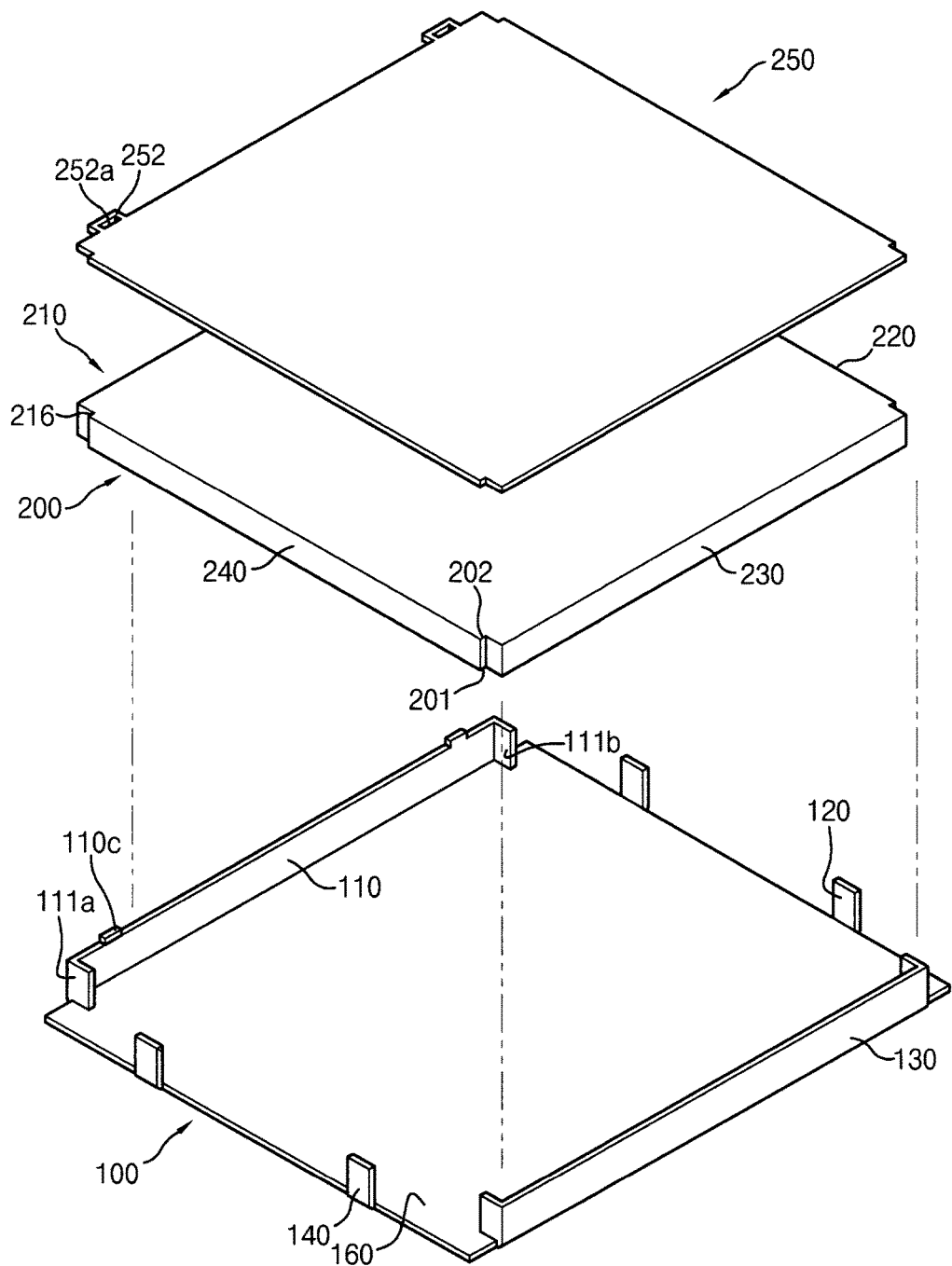
FIG. 1 is an exploded perspective view illustrating an exemplary embodiment of a backlight.

It should be understood that the exemplary embodiments of the present invention described below may be modified in many different ways without departing from the inventive principles disclosed herein, and the scope of the present invention is therefore not limited to these particular embodiments. Rather, these embodiments are provided so that this disclosure will be thorough and complete, and will fully convey the concept of the invention to those skilled in the art by way of example and not of limitation. In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Backlight Assembly

The exemplary embodiments of a backlight assembly described herein include a light guide plate having a stepped portion, an optical sheet disposed on the light guide plate and a receiving container having a bottom plate supporting the light guide plate and the optical sheet, sidewalls extended from edge portions of the bottom plate, and an LGP fixing portion formed at the sidewalls corresponding to the stepped portion to fix the light guide plate.

Hereinafter, the exemplary embodiments of the present invention will be described in detail with reference to the accompanied drawings.

FIG. 1 is an exploded perspective view illustrating an exemplary embodiment of a backlight assembly according to the present invention.

Referring to FIG. 1, a backlight assembly 400 includes a receiving container 100, a light guide plate 200, and an optical sheet 250. The backlight assembly 400 further includes a lamp assembly (as shown in FIGS. 4-7 and 10).

The light guide plate 200 includes a light-reflecting face 201, a light-exiting face 202 opposed to the light-reflecting face 201 and parallel with the light-reflecting face 201, a first side face 210, a second side face 220, a third side face 230, and a fourth side face 240. As illustrated, the first and third side faces 210, 230 may be parallel to each other, the second and fourth side faces 220, 240 may be parallel to each other, and the first side face 210 and the third side face 230 may be perpendicular to the second and fourth side faces 220, 240.

The light guide plate 200 includes a stepped portion 216. The stepped portion 216 is disposed at a corner, a plurality of corners, or all corners of the light guide plate 200. In other words, the stepped portion 216 is formed at a joint region of the first and second side faces 210 and 220. The stepped portion 216 is also formed at a joint region of the second and third side faces 220 and 230. The stepped portion 216 is also formed at a joint region of the third and fourth side faces 230 and 240. The stepped portion 216 is also formed at a joint region of the fourth and first side faces 240 and 210. Thus, each stepped portion 216 forms an indentation at each corner of the light guide plate 200. The illustrated stepped portion 216 includes a first wall extending from one of the side faces, e.g. first side face 210, and a second wall extending from an adjacent side face, e.g. fourth side face 240. The first wall abuts the second wall to form the stepped portion 216. The stepped portion 216, as illustrated, includes perpendicular first and second walls, although the walls may be disposed at alternate angles with respect to each other. Also, although the first and second walls of the stepped portion 216 may be flat, planar walls, they may alternately be curved, jagged, or otherwise non-planar.

The optical sheet 250 is disposed over the light-exiting face 202. The optical sheet 250 includes at least one optical film. The optical sheet 250 includes, for example, a light-diffusing film, a brightness enhancing film (BEF), etc. The optical sheet 250 enhances optical properties of light that exits the light guide plate 200 through the light-exiting face 202. The optical sheet 250 includes a fixing protrusion 252. The fixing protrusion 252 protrudes from a side face of the optical sheet 250. The fixing protrusion 252 includes a fixing hole 252a. The fixing protrusion 252 may include a plurality of fixing holes 252a, or, alternatively, a plurality of fixing protrusions 252 may be formed on one or more side faces of the optical sheet 250, each having one or more fixing holes 252a.

The receiving container 100 includes a bottom plate 160, a first sidewall 110, a second sidewall 120, a third sidewall 130, and a fourth sidewall 140, where each sidewall extends upwardly from the bottom plate 160. The first sidewall 110 of the receiving container 100 faces the first side face 210 of the light guide plate 200. The second sidewall 120 of the receiving container 100 faces the second side face 220 of the light guide plate 200. The third sidewall 130 of the receiving container 100 faces the third side face 230 of the light guide plate 200. The fourth sidewall 140 of the receiving container 100 faces the fourth side face 240 of the light guide plate 200. The sidewalls may be substantially solid walls extending along a majority of a peripheral edge of the bottom plate 160, such as first and third sidewalls 110 and 130, or may be one or more flanges evenly or otherwise spaced, such as second and fourth sidewalls 120, 140.

The first sidewall 110 of the receiving container 100 includes a light guide plate (LGP) fixing portion 111a. For example, a first end portion of the first sidewall 110, which is adjacent to the fourth sidewall 140, is cut and bent toward the stepped portion 216 to form the LGP-fixing portion 111a, so that the light guide plate 200 is fastened to the receiving container 100 when assembled. In one embodiment of the LGP-fixing portion 111a, the LGP-fixing portion 111a is bent substantially perpendicularly to the first sidewall 110, such that the LGP-fixing portion 111a is substantially parallel to, but not coplanar with, the second and fourth sidewalls 120, 140.

A second LGP-fixing portion 111b, similar to the LGP-fixing portion 111a, may also be formed at a second end portion of the first sidewall 110, which is adjacent to the second sidewall 120. Additionally, an LGP-fixing portion, similar to the LGP-fixing portions 111a and 111b, may be formed at a first end portion of the third sidewall 130, which is adjacent to the fourth sidewall 140, and at a second end portion of the third sidewall 130, which is adjacent to the second sidewall 120.

At least one of the sidewalls 110, 120, 130 and 140 includes a fixing boss 110c corresponding to the fixing hole 252a of the optical sheet 250 to fasten the optical sheet 250 to the receiving container 100. The fixing boss 110c is inserted into the fixing hole 252a as the optical sheet is placed on top of the receiving container 100, so that the optical sheet 250 is fixed in place relative to the receiving container 100. The fixing boss 110c may be a small protuberance, projection, or the like extending from an upper peripheral edge of a sidewall, and the positioning and number of fixing bosses 110c correspond to the positioning and number of fixing holes 252a provided on the optical sheet 250.

Figure 2:
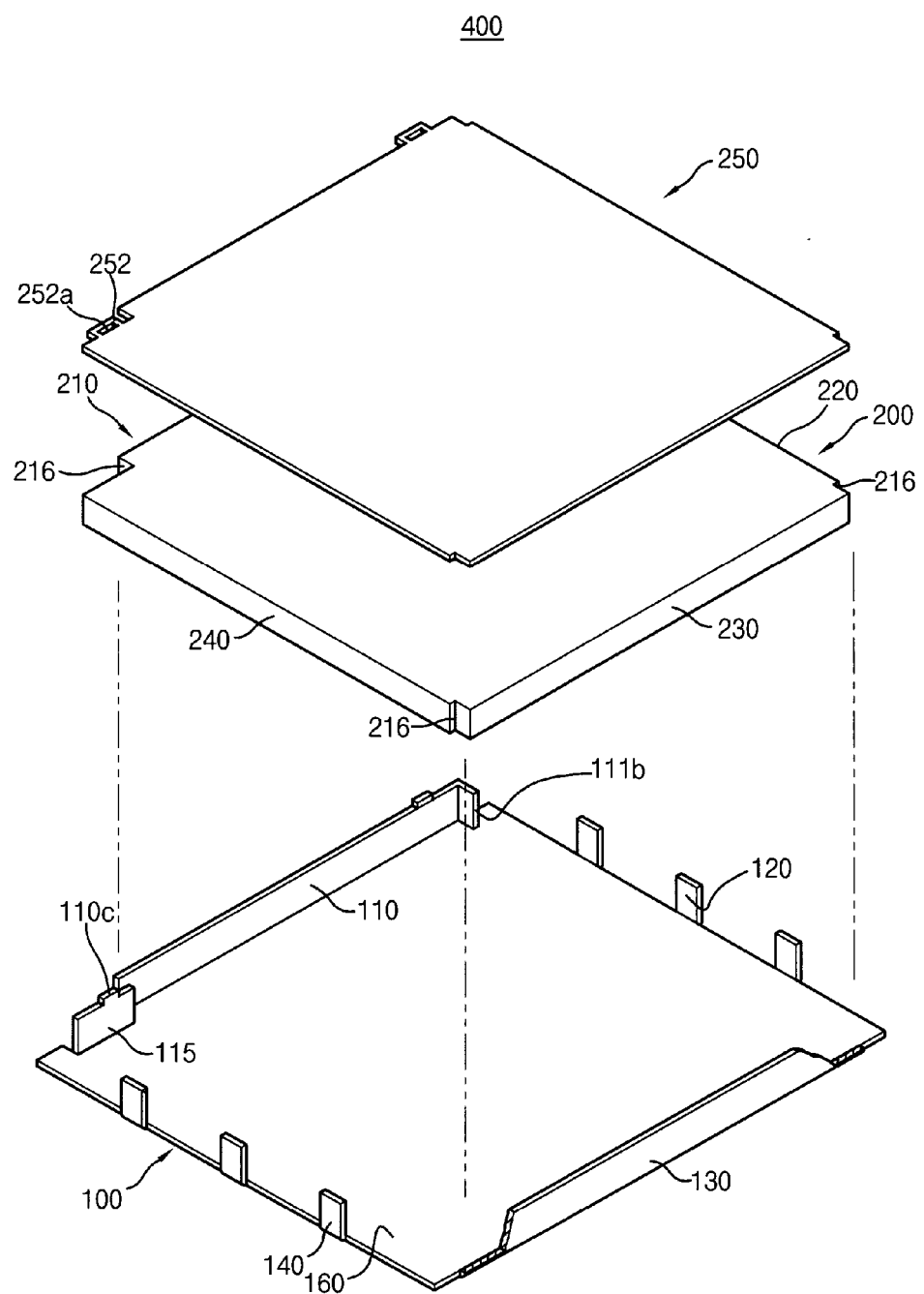
FIG. 2 is an exploded perspective view illustrating another exemplary embodiment of a backlight assembly.
Figure 3:
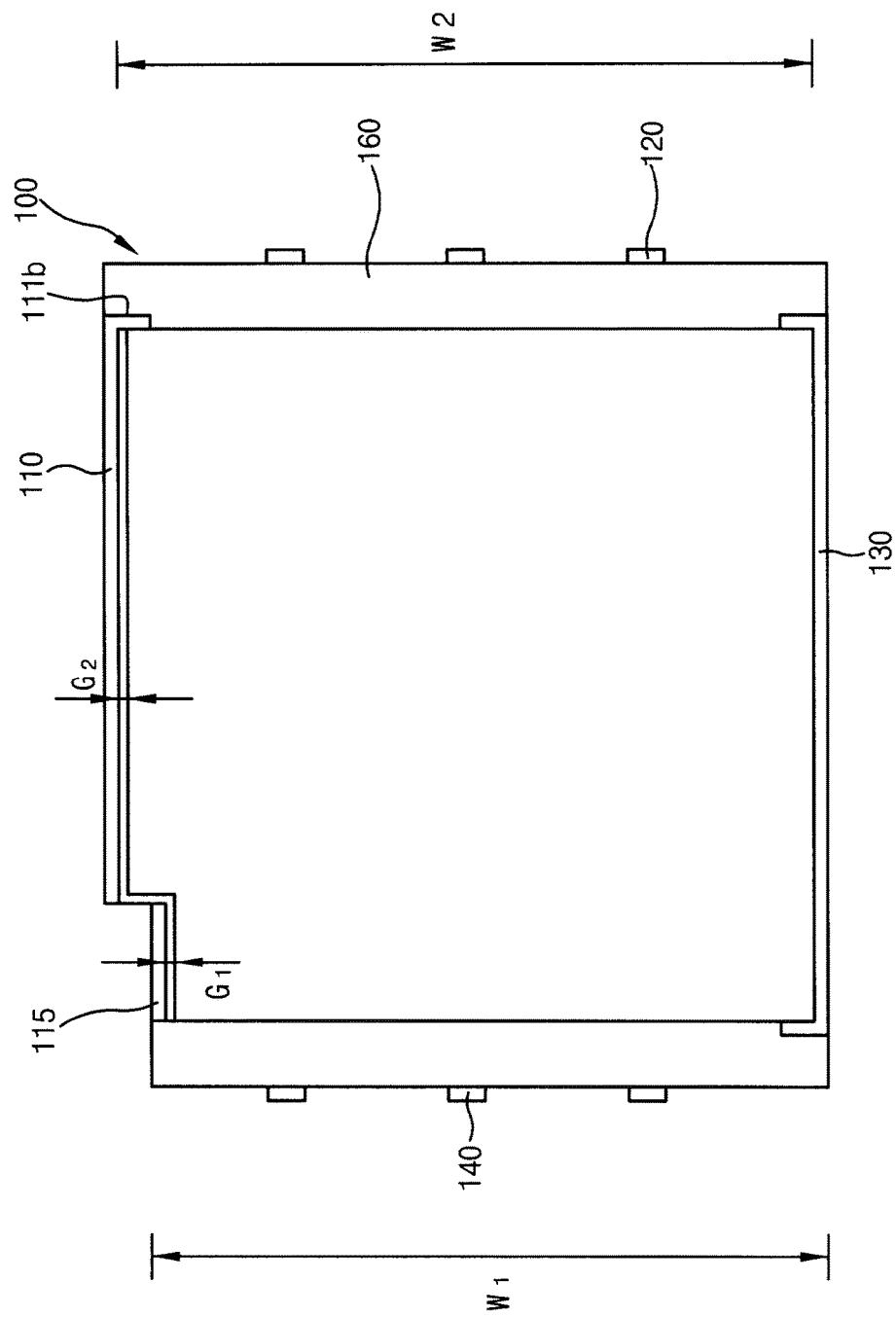
FIG. 3 is a plan view illustrating the backlight assembly in FIG. 2 in an assembled condition.

FIG. 2 is an exploded perspective view illustrating another exemplary embodiment of a backlight assembly according to the present invention, and FIG. 3 is a plan view illustrating the backlight assembly in FIG. 2, in an assembled condition. The backlight assembly of FIG. 2 is substantially the same as the above-described backlight assembly of FIG. 1, except for an LGP-fixing portion as will be further described below. Thus, the same reference numerals will be used to refer to the same or like parts as those described in FIG. 1 and any repetitive explanation concerning the above elements will be omitted.

Referring to FIGS. 2 and 3, a first sidewall 110 of a receiving container 100 includes a first LGP-fixing portion 115 for fixing a light guide plate 200 within the receiving container 100. The first LGP-fixing portion 115 is disposed substantially parallel with the first sidewall 110. However, the first LGP-fixing portion 115 and the first sidewall 110 are not in a same line, that is, they are not co-planar. The first LGP-fixing portion 115 is disposed such that the first LGP-fixing portion 115 corresponds to the stepped portion 216 of the light guide plate 200, such as facing a second wall of the stepped portion 216 that extends from the fourth side face 240. The first LGP-fixing portion 115 is spaced apart from the third sidewall 130 by a first distance W1, and the first sidewall 110 is spaced apart from the third sidewall 130 by a second distance W2. The second distance W2 is greater than the first distance W1. Thus, the first LGP-fixing portion 115 is spaced from the first sidewall 110 by a distance defined generally by the difference between the second distance W2 and the first distance W1.

The first LGP-fixing portion 115 is spaced apart from the second wall of the stepped portion 216 of the light guide plate 200, the second wall extending from the fourth side face 240, by a first gap G1, and the first sidewall 110 of the receiving container 100 is spaced apart from the first side face 210 of the light guide plate 200 by a second gap G2. The second gap G2 is, for example, smaller than the first gap G1.

As in the illustrated embodiment, when the second gap G2 is smaller than the first gap G1, the second wall of the stepped portion 216 of the light guide plate 200 does not make contact with the first LGP-fixing portion 115 of the receiving container 100, wherein, such as during an inadvertent shift due to an impact of the light guide plate 200 within the receiving container 100, the first side face 210 of the light guide plate 200 makes contact with the first sidewall 110 of the receiving container 100 instead of the first LGP-fixing portion 115 making contact with the first sidewall 110. Therefore, the light guide plate 200 and the receiving container 100 are protected because the first sidewall 110 has a larger surface area than the first LGP-fixing portion 115, and therefore absorbs an impact.

The first and second gaps G1 and G2 can be determined by a surface area of the first LGP-fixing portion 115 and the first sidewall 110. For example, when an area of the first LGP-fixing portion 115 is smaller than an area of the first side face 110, the first gap G1 is larger than the second gap G2. On the contrary, if an area of the first LGP-fixing portion 115 is larger than an area of the first side face 110, then the first gap G1 would be smaller than the second gap G2. To vary the size of the gap G1, the first LGP fixing portion 115 may be positioned closer towards or away from the second wall of the stepped portion 216. Changing the size of the gap G1 can make the gap G1 smaller or larger than the gap G2. Alternatively, the gap G2 may be altered via manufacturing the first sidewall 110 at a position closer towards or further away from the first side face 210. Changing the size of the gap G2 can make the gap G2 smaller or larger than the gap G1.

The second wall of the stepped portion 216 of the light guide plate 200, which faces or makes contact with the first LGP-fixing portion 115, has, for example, a rounded-shape. For example, the rounded-shape has a radius of curvature, which is no less than about 0.3 mm. Fixing boss 110c may be formed on the first LGP-fixing portion 115.

The receiving container 100 may further include a second LGP-fixing portion 111b, similar to the second LGP-fixing portion 111b of FIG. 1. The second LGP-fixing portion 111b is disposed at the first sidewall 110. The second LGP-fixing portion 111b is disposed opposite to the first LGP-fixing portion 115. The second LGP-fixing portion 111b corresponds to and faces a first wall of the stepped portion 216, and may further make contact with the stepped portion 216.

The first LGP-fixing portion 115 may also be formed at the third sidewall 130 facing the first sidewall 110. The first LGP-fixing portion 115 formed at the third sidewall 130 has, for example, substantially identical shape to the first LGP-fixing portion 115 formed at the first sidewall 110. In addition, or alternatively, the third sidewall 130 may include the second LGP-fixing portion 111b on one or both ends of the third sidewall 130.

Figure 4:
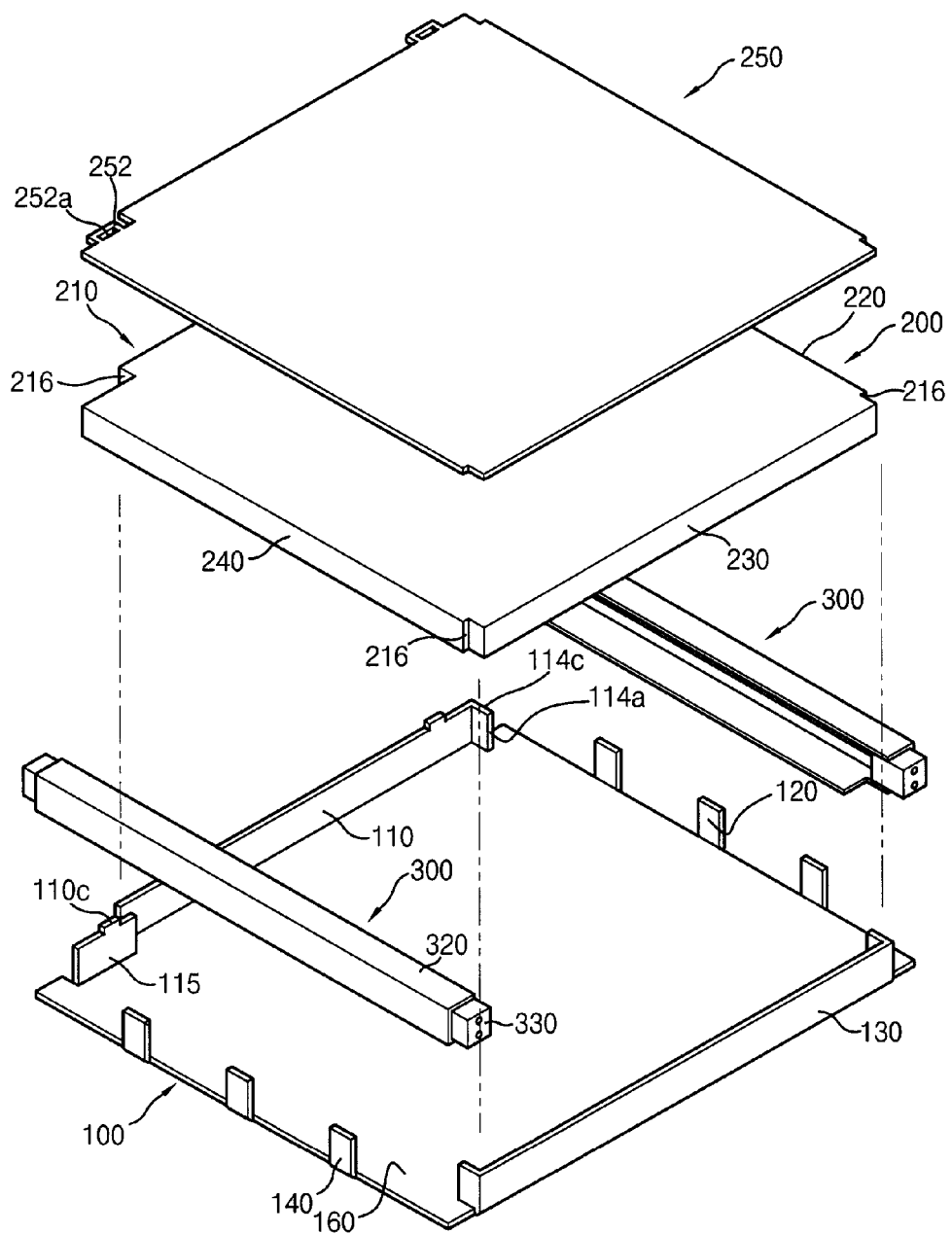
FIG. 4 is an exploded perspective view illustrating another exemplary embodiment of a backlight assembly.
Figure 5:
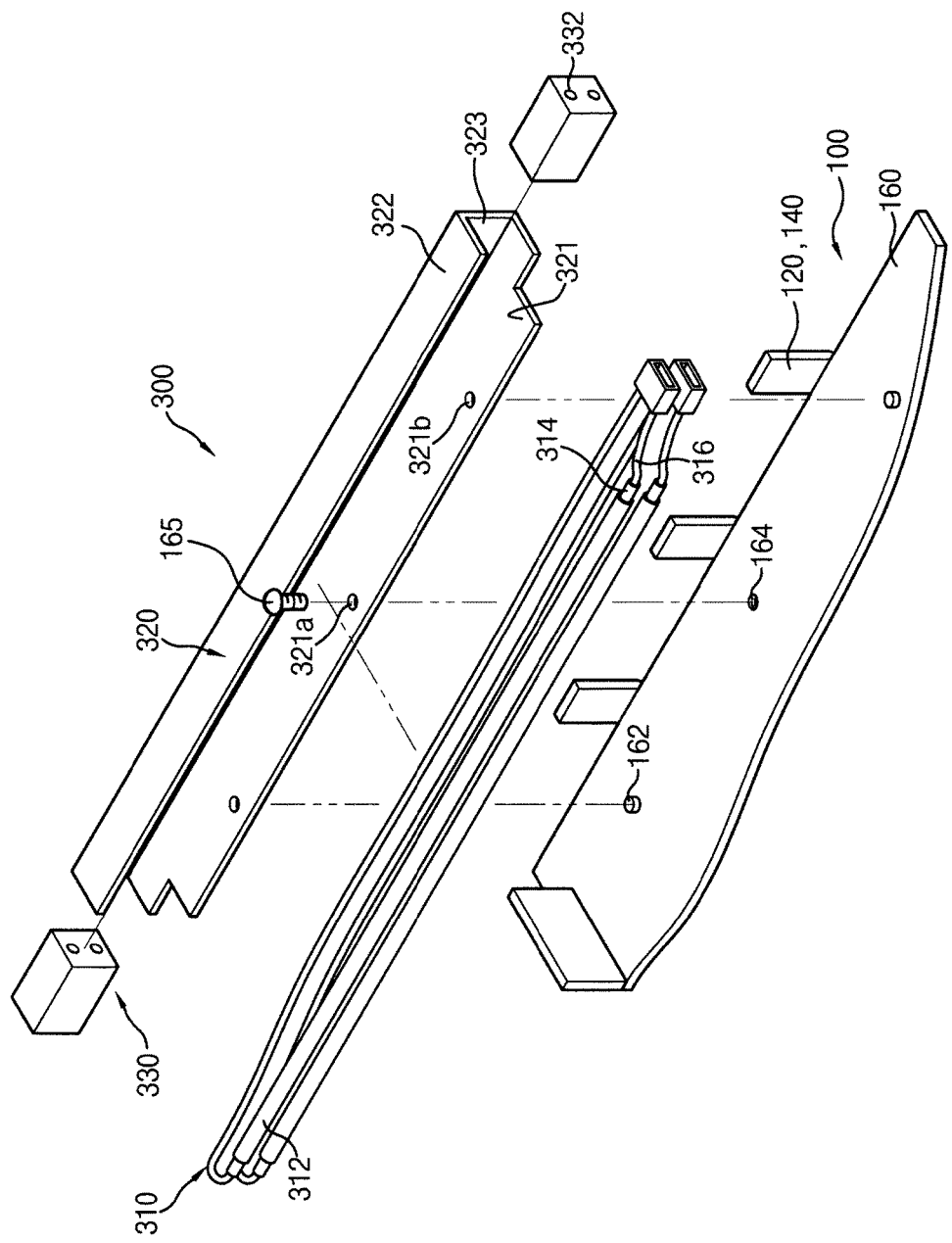
FIG. 5 is an exploded perspective view illustrating an exemplary embodiment of a lamp assembly in FIG. 4.

FIG. 4 is an exploded perspective view illustrating another exemplary embodiment of a backlight assembly according to the present invention, and FIG. 5 is an exploded perspective view illustrating a lamp assembly in FIG. 4. The backlight assembly of FIG. 5 is substantially the same as the above-described backlight assembly in FIG. 2 except for the inclusion of a lamp assembly. Thus, the same reference numerals will be used to refer to the same or like parts as those described in FIG. 2, and any repetitive explanation concerning the above elements will be omitted.

Referring to FIGS. 4 and 5, the first and third sidewalls 110 and 130 face each other, and the second and fourth sidewalls 120 and 140 face each other. The first and third sidewalls 110 and 130 are substantially parallel with each other, and the second and fourth sidewalls 120 and 140 are substantially parallel with each other. Additionally, the second and fourth sidewalls 120 and 140 are substantially perpendicular to the first and third sidewalls 110 and 130.

Two lamp assemblies 300 are disposed adjacent to the second and fourth sidewalls 120 and 140, respectively. A longitudinal axis of each lamp assembly 300 is generally parallel to the sidewalls 120, 140. Each of the lamp assemblies 300 includes a lamp 310, a lamp cover 320 and a lamp holder 330, or two lamp holders 330, one on each end of the lamp 310.

The lamp 310 includes discharge gas (not shown) injected therein, one or more lamp bodies 312 having a fluorescent layer (not shown) formed on inner surface of the lamp body 312, and a pair of electrodes 314 disposed at the lamp body 312 to apply discharge voltage to the discharge gas. The pair of electrodes 314 is electrically connected to the wires 316, respectively. The lamp body 312 includes a longitudinal axis substantially parallel to the second and fourth sidewalls 120, 140.

The lamp cover 320 reflects light generated from the lamp 310 toward the second or fourth side face 220 or 240 of the light guide plate 200. The lamp cover 320 includes a first cover plate 321, a second cover plate 322, and a third cover plate 323 perpendicular to the first cover plate 321 and the second cover plate 322. While the lamp cover 320 is illustrated as having planar and substantially perpendicular cover plates, it should be understood that alternate embodiments of lamp cover 320 would be within the scope of these embodiments, including, but not limited to, a lamp cover 320 with curved walls.

The first cover plate 321 is disposed such that the first cover plate 321 faces the bottom plate 160 of the receiving container 100. The second cover plate 322 is disposed such that the second cover plate 322 faces the first cover plate 321. The first and second cover plates 321, 322 are substantially in parallel with each other. In the illustrated embodiment, an area of the first cover plate 321 is larger than an area of the second cover plate 322. The third cover plate 323 makes contact with and abuts against the second or fourth sidewall 120 or 140, and the third cover plate 323 connects the first and second cover plates 321 and 322.

The first cover plate 321 of the lamp cover 320 includes a first connection hole 321a and a through hole 321b for fastening the lamp cover 320 to the bottom plate 160 of the receiving container 100. For example, the first cover plate 321 includes at least two through holes 321b, and the first connection hole 321a is disposed between the through holes 321b.

The bottom plate 160 of the receiving container 100 includes a boss 162 corresponding to the through hole 321b of the lamp cover 320. Additionally, the bottom plate 160 includes a second connection hole 164 corresponding to the first connection hole 321a of the lamp cover 320. A screw 165 passes through the first and second connection holes 321a and 164 to combine the lamp cover 320 and the receiving container 100.

The lamp 310 is disposed within a space defined by the first, second, and third cover plates 321, 322, and 323. The lamp 310 is combined with the lamp cover 320 via a lamp holder 330, positioned on each end of the lamp 310. The lamp holder 330 has, for example, a rectangular parallelpiped shape and the lamp holder 330 is at least partially inserted into ends of the lamp cover 320 such that the lamp holder 330 makes contact with the first, second, and third cover plates 321, 322, and 323, so that the lamp holder 330 is fastened to the lamp cover 320.

The lamp holder 330 includes at least one insertion hole 332. An end portion of the lamp 310 is inserted into the insertion hole 332, so that the lamp 310 is combined with the lamp holder 330.

The lamp holder 330 makes contact with the end portion of the lamp 310 that generates a large amount of heat. Therefore, the lamp holder 330 is disposed such that the lamp holder 330 dissipates the heat well. A portion of the lamp holder 330 is not covered by the lamp cover 320 and protrudes longitudinally outwardly from the bottom plate 160.

Figure 6:
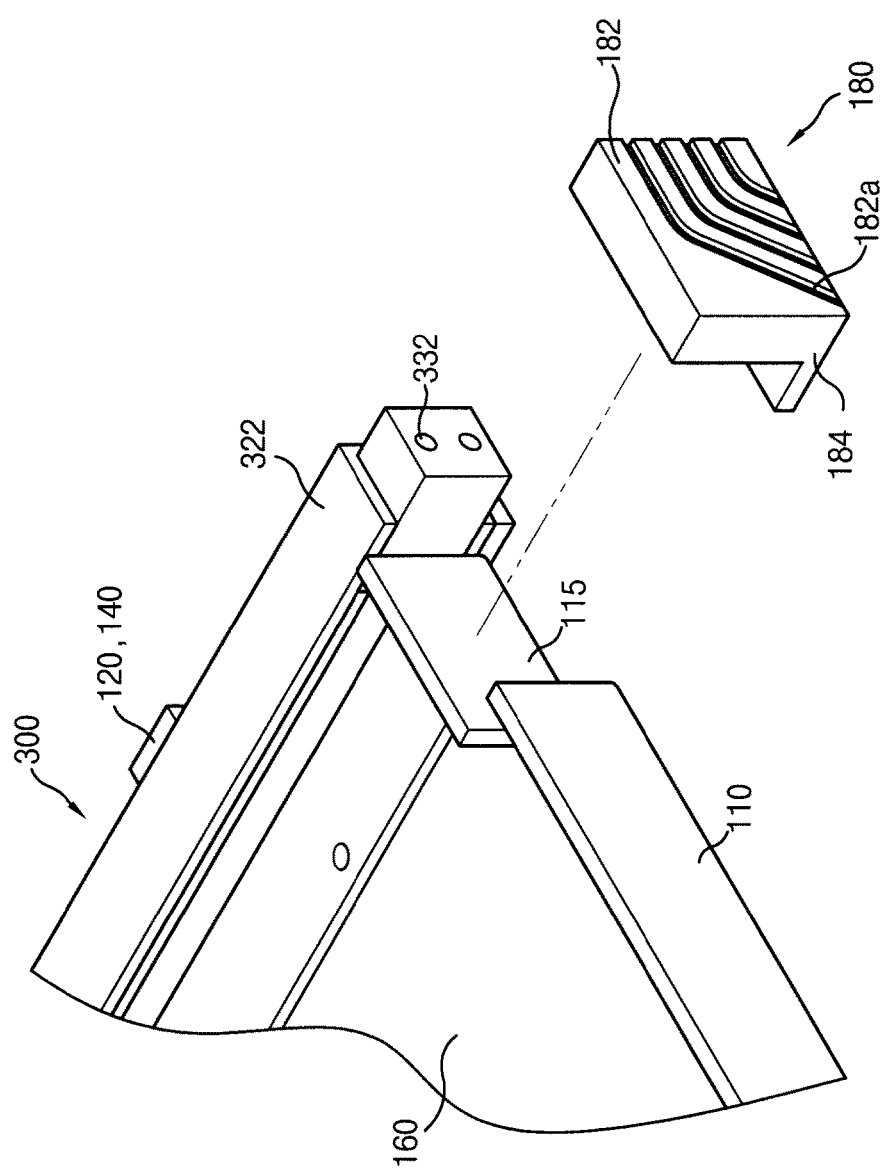
FIG. 6 is an exploded perspective view illustrating another exemplary embodiment of a backlight assembly.

FIG. 6 is an exploded perspective view illustrating a portion of another exemplary embodiment of a backlight assembly. The backlight assembly of FIG. 6 is substantially the same as the above-described backlight assembly in FIG. 4 except further includes a fixing member. Thus, the same reference numerals will be used to refer to the same or like parts as those described in FIG. 4 and any repetitive explanation concerning the above elements will be omitted.

Referring to FIG. 6, the LGP-fixing portion 115 is spaced apart from the first sidewall 110, so that light may be leaked through a space defined between the LGP-fixing portion 115 and the first sidewall 110.

In order to prevent leakage of light, a fixing member 180 is disposed at a backside of the LGP-fixing portion 115, where the backside of the LGP-fixing portion 115 is the side of the LGP-fixing portion 115 not facing the second wall of the stepped portion 216. The fixing member 180 blocks the space between the LGP-fixing portion 115 and the first sidewall 110 to prevent the leakage of light.

The fixing member 180 includes a first fixing portion 182 and a second fixing portion 184. The second fixing portion 184 is protruded from an end portion of the first fixing portion 182, such as perpendicularly, so that the fixing member 180 has an L-shaped cross-section.

A first face of the first fixing portion 182 makes contact with the backside of the LGP-fixing portion 115. A thickness of the first fixing portion 182 from the first face of the first fixing portion 182 to a second face of the first fixing portion 182 is at least as large as a distance defined between planes of the first LGP fixing portion 115 and the first sidewall 110, such as, but not limited to, the distance defined generally by the difference between the second distance W2 and the first distance W1, or larger. The second fixing portion 184 is disposed at the bottom plate 160 of the receiving container 100.

The fixing member 180 may further also fix the wire 316 that is electrically connected to the electrode 314 of the lamp 310 in FIG. 5. The first fixing portion 182 includes grooves 182a, extending at least through the second face of the first fixing portion 182, for receiving the wire 316.

According to the present embodiment, the backlight assembly may include a plurality of the fixing members corresponding to a plurality of the LGP-fixing portions 115.

Figure 7:
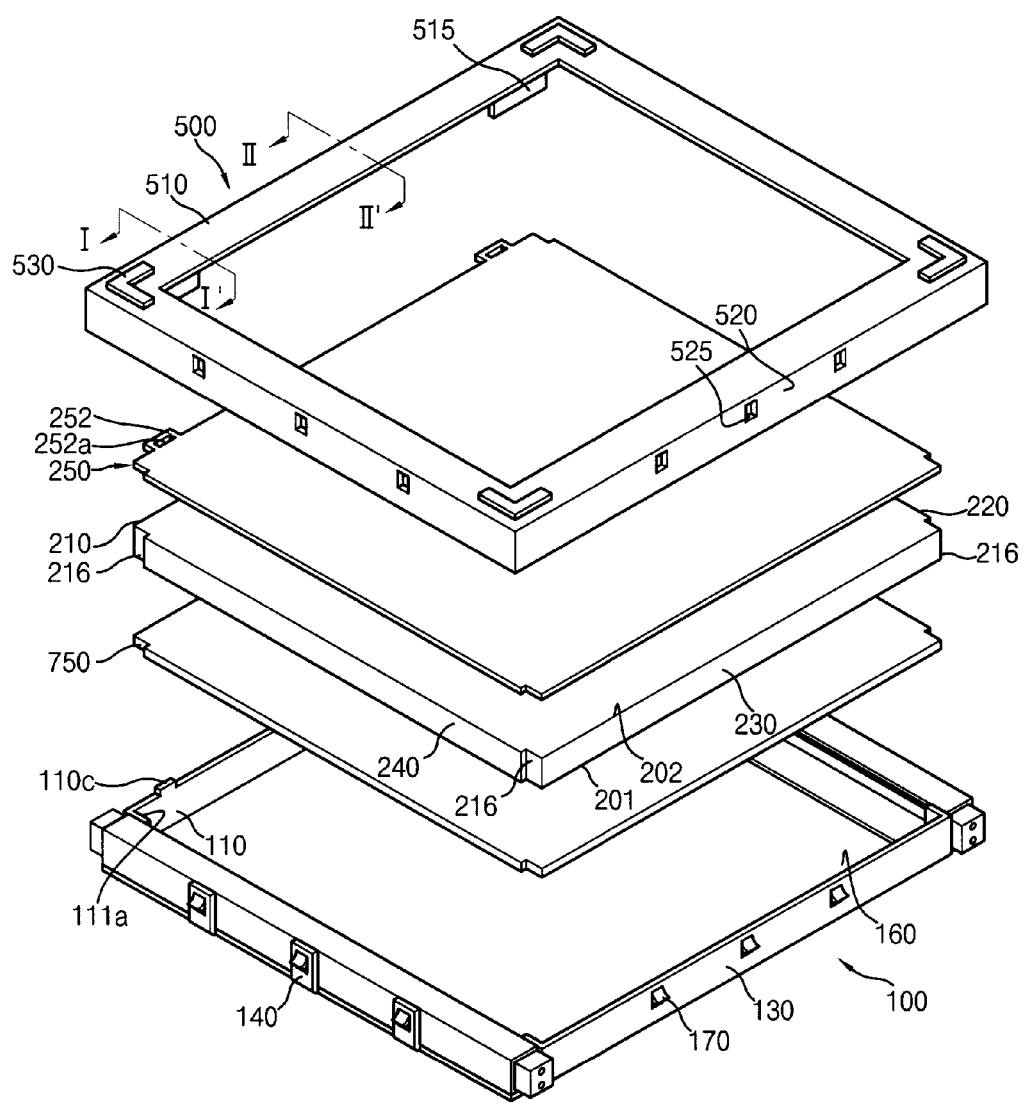
FIG. 7 is an exploded perspective view illustrating another exemplary embodiment of a backlight assembly.
Figure 8:
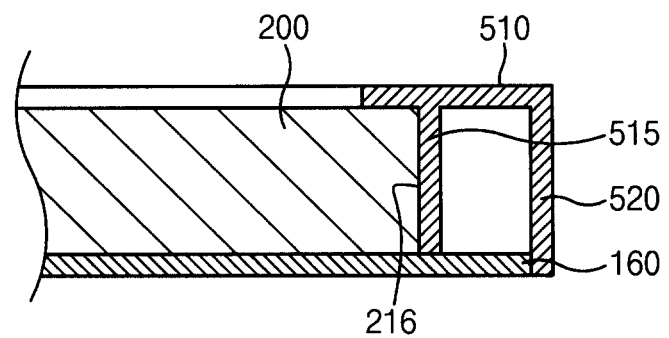
FIG. 8 is a cross-sectional view taken along line I-I' in FIG. 7.
Figure 9:
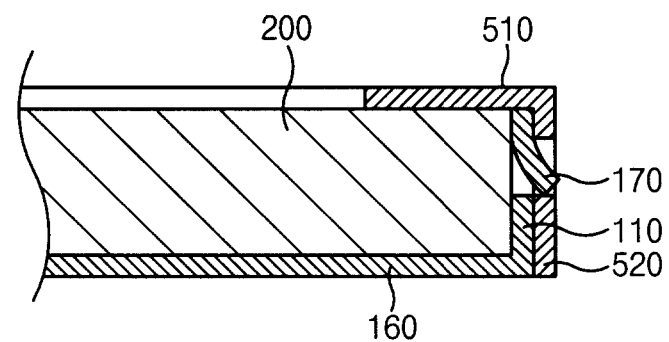
FIG. 9 is a cross-sectional view taken along line II-II' in FIG. 7.

FIG. 7 is an exploded perspective view illustrating another exemplary embodiment of a backlight assembly. FIG. 8 is a cross-sectional view taken along a line I-I' in FIG. 7, and FIG. 9 is a cross-sectional view taken along a line II-II' in FIG. 7. The backlight assembly of FIG. 7 is substantially the same as the above-described backlight assembly in FIGS. 1 and 4 except further includes a panel-guiding member 500 and elements for engaging the panel-guiding member 500. Thus, the same reference numerals will be used to refer to the same or like parts as those described in FIGS. 1 and 4 and any repetitive explanation concerning the above elements will be omitted.

Referring to FIGS. 7, 8 and 9, a backlight assembly further comprises a panel-guiding member 500. The panel-guiding member 500 fastens the light guide plate 200 to the receiving container 100. The panel-guiding member 500 includes an upper plate 510 facing the bottom plate 160 of the receiving container 100. That is, the upper plate 510 is parallel with the bottom plate 160. The upper plate 510 has a frame shape, where a large opening is centrally provided within the upper plate 510 for allowing the passage of light. A side plate 520 faces the first through fourth sidewalls 110, 120, 130 and 140 of the receiving container 100. The side plate 520 is combined with the sidewalls 110, 120, 130 and 140 of the receiving container 100.

The panel-guiding member 500 includes a plurality of guide protrusions 530. The guide protrusions 530 are formed on an upper surface of the upper plate 510 of the panel-guiding member 500, where the upper surface of the upper plate 510 is a surface that faces away from the receiving container 100 and faces towards a display panel, as will be further described below. The guide protrusions 530 guide the display panel. For example, four guide protrusions 530 are disposed at four corners of the panel-guiding member 500, respectively, although alternate numbers and arrangements of guide protrusions 530 would be within the scope of these embodiments.

The panel-guiding member 500 also includes at least one combination hole 525. In the illustrated embodiment, a plurality of the combination holes 525 are formed at the side plate 520 of the panel-guiding member 500. Additionally, the receiving container 100 includes at least one combination hook 170, and corresponds in number and arrangement to the combination holes 525. The combination hook 170 is illustratively formed at the third and fourth sidewalls 130 and 140 of the receiving container 100, but may be formed along any, including all, of the sidewalls 110, 120, 130, and 140. The combination hook 170 includes a protruding member extending outwardly from one or more of the sidewalls 110, 120, 130, and 140. When the panel guiding member 500 is pressed over the receiving container 100, the combination hooks 170 are initially compressed inwardly, but as the combination holes 525 move over the combination hooks 170, the combination hooks 170 are allowed to return to a biased outwardly protruding position, thus seated within or protruding outwardly of the combination holes 525. As can be seen in FIG. 9, the panel-guiding member 500 cannot be accidentally displaced from the receiving container 100 because the combination hooks 170 prevent accidental movement of the side plate 520 in a direction away from the bottom plate 160. The combination hooks 170 may be forcibly pressed inwardly by a tool or the like if removal of the panel-guiding member 500 from the receiving container 100 is desired. In an alternate embodiment, the combination hooks 170 may be provided on the side plate 520 and the combination holes 525 may be provided on the sidewalls of the receiving container 100.

The panel-guiding member 500 further includes a pressing protrusion 515. The pressing protrusion 515 makes contact with the stepped portion 216 of the light guide plate 200 to prevent the drift of the light guide plate 200. The pressing protrusion 515 is protruded toward the bottom plate 160 of the receiving container 100 from the upper plate 510 as shown in FIG. 8.

The pressing protrusion 515 protects the light guide plate 200 and the receiving container 100, and prevents the drift of the light guide plate 200.

Display Device

Figure 10:
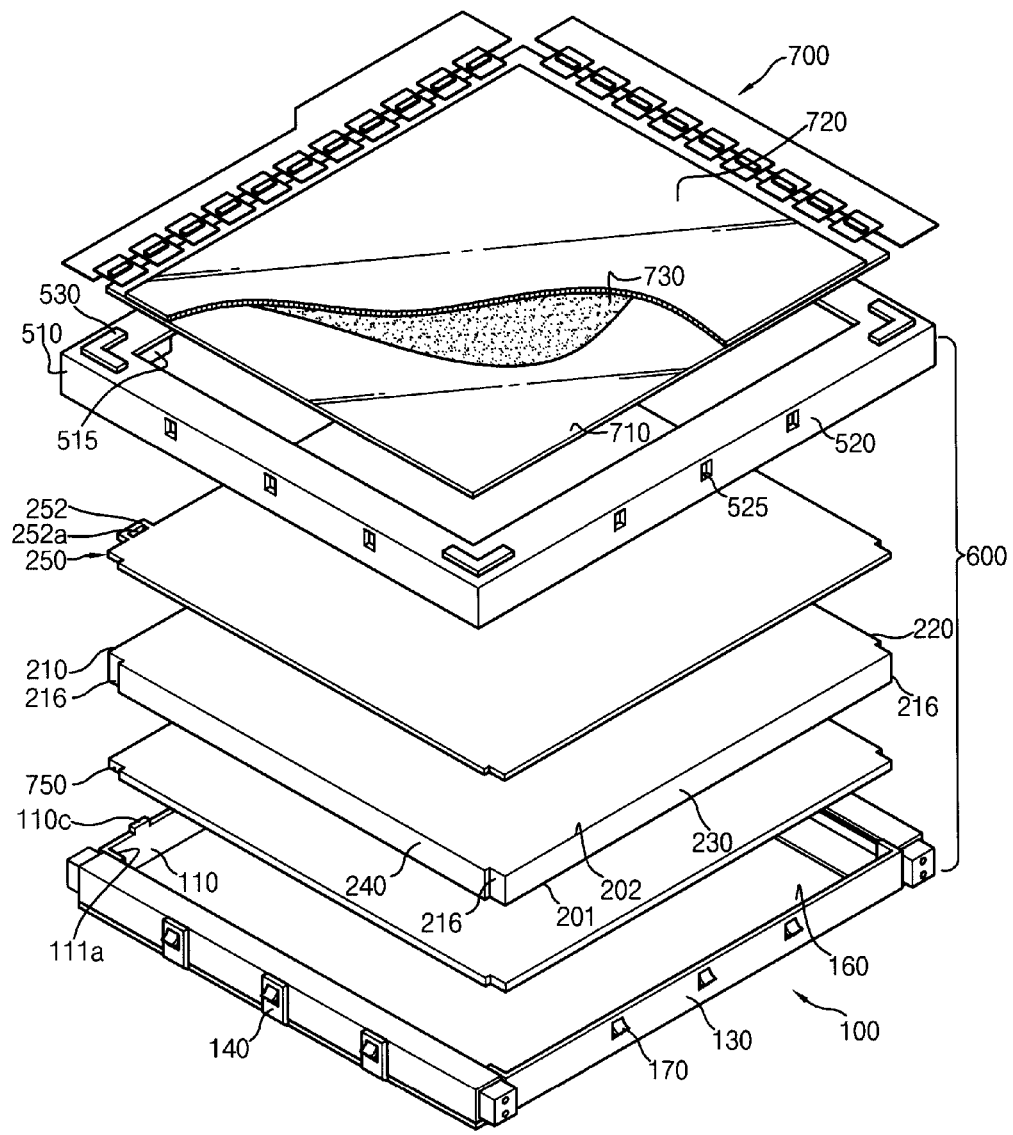
FIG. 10 is a perspective view illustrating an exemplary embodiment of a display device.

FIG. 10 is a perspective view illustrating an exemplary embodiment of a display device according to the present invention. The display device of FIG. 10 includes the above-described backlight assembly in FIG. 7. The display device further includes a display panel. Thus, the same reference numerals will be used to refer to the same or like parts as those described in FIG. 7, and any repetitive explanation concerning the above elements will be omitted. The display device includes a display panel 700 and a backlight assembly 600. The display panel 700 is disposed on the panel-guiding member 500. The display panel 700 converts light generated from the backlight assembly 600 into an image. The display panel 700 includes a thin film transistor (TFT) substrate 710, a color filter substrate 720, and a liquid crystal layer 730.

The TFT substrate 710 and the color filter substrate 720 control the liquid crystal layer 730 disposed between the TFT substrate 710 and the color filter substrate 720. The TFT substrate 710 includes a plurality of pixel electrodes (not shown) arranged in a matrix shape. The pixel electrodes include an optically transparent and electrically conductive material such as indium tin oxide (ITO), indium zinc oxide (IZO), etc.

The color filter substrate 720 faces the TFT substrate 710. The color filter substrate 720 includes a plurality of color filters (not shown) and a common electrode (not shown).

An arrangement of liquid crystal molecules within the liquid crystal layer 730 disposed between the TFT substrate 710 and the color filter substrate 720 is altered when electric fields are applied to the liquid crystal layer 730. When the arrangement of the liquid crystal molecules is altered, an optical transmissivity of the liquid crystal layer 730 is changed to display an image.

The backlight assembly 600 further includes one or more optical sheets 250. The optical sheets 250 are disposed between the display panel 700 and the light guide plate 200. The optical sheets 250 enhance optical properties such as luminance of the light and luminance uniformity of the light exiting the light guide plate 200. The backlight assembly 600 further includes a light-reflecting plate 750 that is disposed between the bottom plate 160 of the receiving container 100 and the light guide plate 200. The light-reflecting plate 750 reflects light toward the light guide plate 200. The optical sheet 250 and the light-reflecting plate 750 may include stepped portions corresponding to stepped portions 216 of the light guide plate 200 such that the light-reflecting plate 750, the light guide plate 200, and the optical sheet 250 may all be guided into and seated within the receiving container 100.

According to the present invention, the light-reflecting plate, the light guide plate, the lamp assembly, the optical sheet, the panel-guiding member and the display panel are assembled in sequence through a top-down assembling method. That is, the light-reflecting plate 750 may first be placed within the receiving container 100. The stepped portions of the light-reflecting plate 750 can help ensure that the light-reflecting plate 750 is accurately placed within the receiving container 100. Then, the light guide plate 200 may be placed within the receiving container 100 and on top of the reflecting plate 750. The stepped portions 216 of the light guide plate 200 are aligned with the LGP fixing portions 111a, 111b, and/or 115 for ensuring proper placement and protection of the light guide plate 200. The lamp assemblies 300 may be arranged within the receiving container 100 adjacent to the light guide plate 200. If the LGP fixing portion 115 is used, then a fixing member 180 may be combined with the LGP fixing portion 115 to block light leakage. The optical sheet or sheets 250 may then be placed above the light guide plate 200, while aligning all fixing holes 252a with fixing bosses 110c and stepped portions with any LGP fixing portions. The panel guiding member 500 may then be placed over the optical sheet 250 and positioned to surround the receiving container 100 such that the combination hooks 170 from the receiving container 100 are snapped within the combination holes 525 on the side plate 520 of the panel guiding member 500 and the pressing protrusions 515 are placed against any stepped portions 216. The display panel 700 is then placed upon the guide protrusions 530 of the panel-guiding member 500. Therefore, the display device is easily assembled. Furthermore, a defilement that may happen during an assembling process may be reduced to enhance productivity.

Having described the exemplary embodiments of the present invention and its advantages, it is noted that various changes, substitutions and alterations can be made herein without departing from the spirit and scope of the invention as defined by appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A backlight assembly comprising:
   a light guide plate having a recessed stepped portion in a plan view;
   a light source assembly providing a light to the light guide plate; and
   a receiving container which receives the light guide plate and the light source assembly,
   the receiving container including a bottom plate, a sidewall that extends continuously from an edge portion of the bottom plate in a vertical direction and extends in a first horizontal direction in a plan view, and a fixing portion that extends continuously from the sidewall into the recessed stepped portion of the light guide plate in a second horizontal direction substantially perpendicular to the first horizontal direction in the plan view so that the sidewall is unitary and indivisible with the bottom plate and the fixing portion, wherein the fixing portion has a plate shape substantially parallel to a vertical direction, and a thickness of the fixing portion along the first horizontal direction is substantially same as the thickness of the sidewall along the second horizontal direction.

2. The backlight assembly of claim 1, further comprising an optical sheet disposed on the light guide plate.

3. The backlight assembly of claim 2, wherein the optical sheet includes a fixing hole, and the sidewall includes a fixing boss inserted into the fixing hole.

4. The backlight assembly of claim 3, wherein the fixing boss extends continuously from an upper end of the sidewall.

5. The backlight assembly of claim 1, wherein the fixing portion extends from a distal end of the sidewall, which is defined along the first horizontal direction.

6. The backlight assembly of claim 1, wherein the recessed stepped portion is disposed at a corner of the light guide plate.

7. The backlight assembly of claim 1, wherein the sidewall and the bottom plate have a substantially same thickness.

8. The backlight assembly of claim 1, wherein the light source assembly includes:
  a light source that generates light;
  a light source cover that covers the light source; and
  a light source holder that holds the light source, wherein the light source holder is combined with the light source cover for fastening the light source to the light source cover.

9. A display device comprising:
  a backlight assembly; and
  a display panel converting light generated from the backlight assembly into an image,
  wherein the backlight assembly includes:
  a light guide plate having a recessed stepped portion in a plan view;
  a light source assembly providing a light to the light guide plate; and
  a receiving container which receives the light guide plate and the light source assembly,
  the receiving container including a bottom plate, a sidewall that extends continuously from an edge portion of the bottom plate in a vertical direction and extends in a first horizontal direction in a plan view, and a fixing portion that extends continuously from the sidewall into the recessed stepped portion of the light guide plate in a second horizontal direction substantially perpendicular to the first horizontal direction in the plan view so that the sidewall is unitary and indivisible with the bottom plate and the fixing portion,
  wherein the fixing portion has a plate shape substantially parallel to a vertical direction, and a thickness of the fixing portion along the first horizontal direction is substantially same as the thickness of the sidewall along the second horizontal direction.

10. The display device of claim 9, wherein the backlight assembly further includes an optical sheet disposed on the light guide plate.

11. The display device of claim 10, wherein the optical sheet includes a fixing hole, and the sidewall includes a fixing boss inserted into the fixing hole.

12. The display device of claim 11, wherein the fixing boss extends continuously from an upper end of the sidewall.

13. The display device of claim 9, wherein the fixing portion extends from a distal end of the sidewall, which is defined along the first horizontal direction.

14. The display device of claim 9, wherein the recessed stepped portion is disposed at a corner of the light guide plate.

15. The display device of claim 9, wherein the sidewall and the bottom plate have a substantially same thickness.

16. The display device of claim 9, wherein the light source assembly includes:
  a light source that generates light;
  a light source cover that covers the light source; and
  a light source holder that holds the light source, wherein the light source holder is combined with the light source cover for fastening the light source to the light source cover.

17. The display device of claim 9, further comprising a panel guiding member combined with the receiving container, wherein the display panel is disposed on the panel guiding member.

18. The display device of claim 9, wherein the fixing portion has a plate shape substantially perpendicular to both an upper surface of the bottom plate and a surface of the sidewall, which faces the light guide plate.

* * * * *